No. 731,986. PATENTED JUNE 23, 1903.
M. WARREN.
VEGETABLE CRUSHER.
APPLICATION FILED JAN. 28, 1903.
NO MODEL.
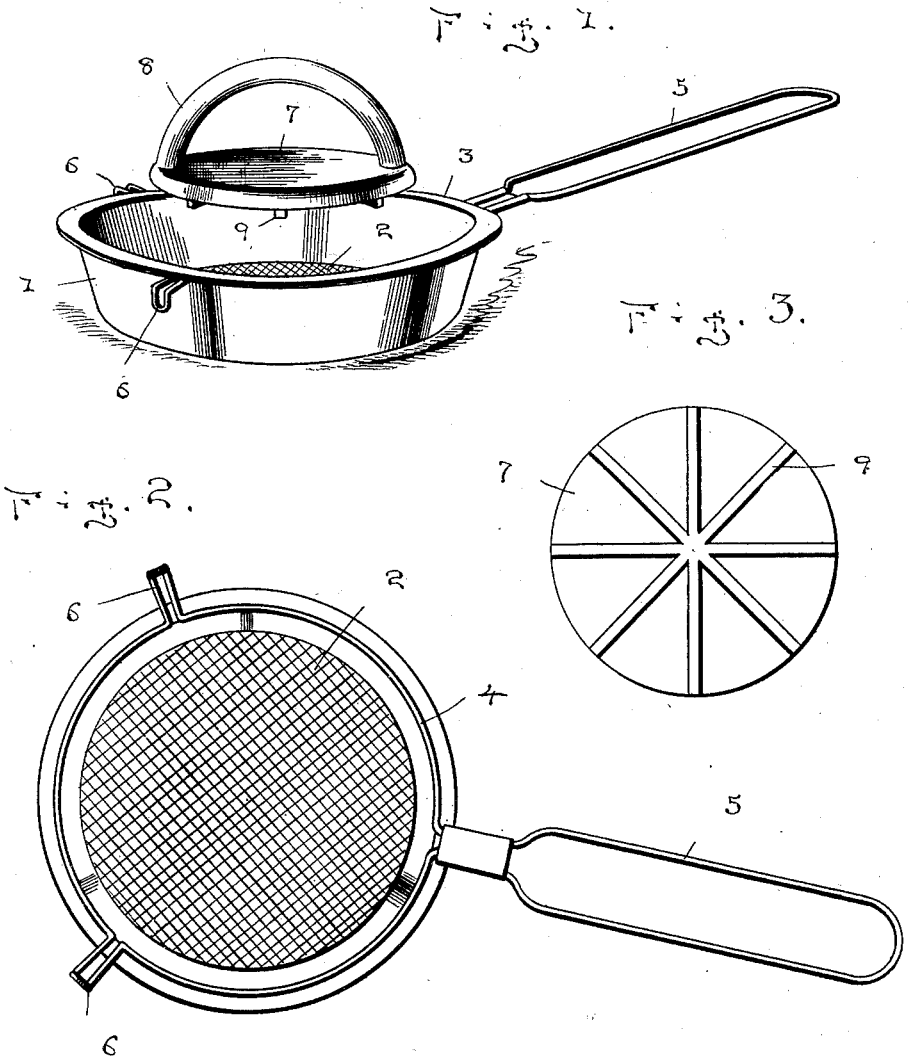

No. 731,986.

Patented June 23, 1903.

UNITED STATES PATENT OFFICE.

MARY WARREN, OF BATTLECREEK, MICHIGAN.

VEGETABLE-CRUSHER.

SPECIFICATION forming part of Letters Patent No. 731,986, dated June 23, 1903.

Application filed January 28, 1903. Serial No. 140,911. (No model.)

*To all whom it may concern:*

Be it known that I, MARY WARREN, a citizen of United States, residing at Battlecreek, in the county of Calhoun and State of Michigan, have invented new and useful Improvements in Vegetable-Crushers, of which the following is a specification.

My invention relates to new and useful improvements in separators for removing seeds from tomatoes, grapes, &c.; and its object is to provide means whereby the material contained within the separator may be agitated until the parts are separated, said agitator being provided with means whereby the seeds may be moved upon the straining-surface of the separator without being forced therethrough.

With the above and other objects in view the invention consists in providing a receptacle the bottom of which has a plurality of apertures therein formed by stamping sheet metal or by constructing said bottom of wire-netting.

The invention also consists in providing an agitator having a series of ribs upon the lower or working surface thereof, which are adapted to bear upon the bottom of the separator and scrape the seeds thereover.

The invention also consists in the further novel construction and combination of parts hereinafter more fully described and claimed, and illustrated in the accompanying drawings, showing the preferred form of my invention, and in which—

Figure 1 is a perspective view of the device, showing the agitator raised from the bottom of the separator. Fig. 2 is a bottom plan view of the device, and Fig. 3 is a bottom plan view of the agitator.

Referring to the figures by numerals of reference, 1 is a preferably circular receptacle, the bottom 2 of which is preferably formed of wire-netting. A flange 3 incloses the receptacle at the upper edge thereof, and a ring 4 also extends around the receptacle 1 and is secured thereto in any suitable manner. This ring is adapted to bear upward upon the flange when the receptacle is raised and has a handle 5 formed integral therewith. Hooks 6 are also formed with the ring at desired intervals and are adapted to engage the top of a bowl or other receptacle and support the separator in position thereon. A circular block 7 forms the body of a combined crusher and agitator, and this block has a handle 8 secured thereon. The block is preferably of a diameter equal to the diameter of the bottom of receptacle 1 and is provided upon its lower surface with ribs 9, formed integral therewith and radiating from the center to the periphery thereof at desired distances apart. To separate seeds of tomatoes, grapes, &c., from the pulp thereof, the material is placed upon the bottom 2 and agitator 7 is then pressed downward thereon to crush the same. A rotary motion is then imparted to the agitator by means of handle 8, and the ribs 9 will scrape the upper surface of the bottom and press the seeds from the pulp, causing them to accumulate between said ribs. The pulp will be forced downward through the apertures in the bottom 2. After a sufficient quantity of material has been separated in this manner the seeds can be removed from the separator and the operation above described repeated.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

In a vegetable-crusher of the character described, the combination with a receptacle having apertures in the bottom thereof, a handle and supporting-hooks extending from the body of the receptacle, of a combined crusher and agitator comprising a body portion, a handle extending upward therefrom, and ribs upon the lower surface of the body portion and formed integral therewith and radiating from its center to its periphery.

In testimony whereof I affix my signature in presence of two witnesses.

MARY WARREN.

Witnesses:
GOLDIE STARKEY,
C. L. ASHLEY.